(12) United States Patent
Ransom

(10) Patent No.: US 7,837,778 B1
(45) Date of Patent: Nov. 23, 2010

(54) METHOD OF TREATING TIRE SURFACES

(76) Inventor: Roland E. (Randy) Ransom, 132 Ashton Ct., Clemmons, NC (US) 27012

(*) Notice: Subject to any disclaimer, the term of this patent is extended or adjusted under 35 U.S.C. 154(b) by 236 days.

(21) Appl. No.: 11/634,353

(22) Filed: Dec. 5, 2006

Related U.S. Application Data

(60) Provisional application No. 60/742,016, filed on Dec. 5, 2005.

(51) Int. Cl.
 C09K 3/14 (2006.01)
 C04B 28/36 (2006.01)
 C09D 7/00 (2006.01)

(52) U.S. Cl. ............... 106/36; 106/287.23; 106/287.35; 152/151; 152/167; 152/185; 152/208; 156/308.6; 156/305; 252/182.11; 524/315; 524/314; 524/306; 524/381; 427/384

(58) Field of Classification Search ............ 252/182.11; 524/314, 315, 306, 381; 106/36, 3, 2; 510/189; 427/384; 152/151, 167, 185, 208; 156/305, 156/308.6
See application file for complete search history.

(56) References Cited

U.S. PATENT DOCUMENTS

| | | | | | |
|---|---|---|---|---|---|
| 2,921,918 | A | * | 1/1960 | Mooney et al. | 523/150 |
| 3,271,170 | A | * | 9/1966 | Ahlberg et al. | 106/36 |
| 3,399,706 | A | * | 9/1968 | Prusha | 152/211 |
| 3,968,198 | A | * | 7/1976 | Honda et al. | 264/343 |
| 4,261,407 | A | * | 4/1981 | Vosnick | 152/450 |
| 4,310,427 | A | * | 1/1982 | Wun | 508/143 |
| 4,567,928 | A | * | 2/1986 | Takiguchi | 152/209.1 |
| 5,281,436 | A | * | 1/1994 | Swidler | 427/156 |
| 5,540,767 | A | * | 7/1996 | Ronlan | 106/287.35 |
| 5,719,221 | A | * | 2/1998 | Swidler | 524/309 |
| 5,891,525 | A | * | 4/1999 | Chauffour et al. | 427/387 |
| 6,837,512 | B2 | * | 1/2005 | Long | 280/604 |
| 6,858,664 | B2 | * | 2/2005 | Wentworth et al. | 524/315 |
| 7,285,588 | B2 | * | 10/2007 | O'Rourke et al. | 524/321 |
| 2003/0114562 | A1 | * | 6/2003 | Sitabkhan et al. | 524/261 |
| 2003/0168642 | A1 | * | 9/2003 | Shannon | 252/500 |
| 2004/0055680 | A1 | * | 3/2004 | Cottin et al. | 152/151 |
| 2004/0131787 | A1 | * | 7/2004 | Fang | 427/385.5 |
| 2004/0144462 | A1 | * | 7/2004 | Zanzig et al. | 152/151 |
| 2005/0153138 | A1 | * | 7/2005 | Halladay | 428/421 |
| 2005/0197277 | A1 | * | 9/2005 | Gallagher et al. | 510/475 |
| 2006/0035030 | A1 | * | 2/2006 | Shannon et al. | 427/372.2 |
| 2006/0225615 | A1 | * | 10/2006 | Raman et al. | 106/482 |

FOREIGN PATENT DOCUMENTS

EP 0 708 169 A2 * 4/1995
WO WO 2005073326 A2 * 8/2005

OTHER PUBLICATIONS rrstar.com "For improving traction at Rockford Speedway, Coke is it". Doug Goodman.*
Indoor Kart Racing, FX Caprara.*

* cited by examiner

*Primary Examiner*—Mark Eashoo
*Assistant Examiner*—Jane L Stanley
(74) *Attorney, Agent, or Firm*—Robert W. Pitts

(57) ABSTRACT

This application is directed to a method of treating tires so that the tires will have better performance, especially when used for racing. The method disclosed herein is especially suited for use in go kart racing, although the method can be used for other applications in which the adhesion and hardness of tires, after their manufacture is to be altered. The method also includes cleaning steps and formulations. This method involves the selective use of various esters to alter tire characteristics as desired.

27 Claims, No Drawings

METHOD OF TREATING TIRE SURFACES

CROSS REFERENCE TO PRIOR CO-PENDING PATENT APPLICATION

This application claims the benefit of prior U.S. Provisional Patent Application Ser. No. 60/742,016 filed Dec. 5, 2005, and the contents of that application are also incorporated herein by reference.

FIELD OF THE INVENTION

This invention relates to methods of using formulations including esters applied to tires after their manufacture to improve the performance of the tires, and especially to improve the racing performance of tires to which the esters have been applied.

BACKGROUND OF THE INVENTION

Tire treatments are used to modify tire performance, especially for racing, by the application of chemicals after manufacturing. The current method or art for modifying the performance of tires is to apply various liquid chemicals that are predominately petroleum distillates, and/or coal tar distillates mixed in various proportions. These prior art tire treatments include Methyl Naphthalene (a commercially available blend of 1-Methylnaphthalene, 2-Methylnaphthalene and Naphthalene), mineral spirits, lacquer thinner, toluene, Xylene, Creosote, DEET (diethyl toluamide), automatic transmission fluid, WD-40, Naphthenic Solvents, Naphthenic Oils, Paraffinic Solvents, Paraffinic Oils, Aromatic Solvents, Aromatic Oils, Ethyl-Benzene, and various commercial blends of these chemicals and blends.

Many of these chemicals, currently used as racing tire treatments, are known carcinogens, suspect carcinogens, mutagens, teratogens, marine pollutants, highly flammable, or comprise other environmental pollutants and/or combinations thereof. Many of these chemicals used in prior art racing tire treatments have little or no biodegradability. Furthermore, many of these chemicals are routinely found in Superfund sites.

The desired modifications achieved by the use of these prior art chemicals may include lowering the durometer of the tire or alternatively to minimize the effect on durometer. At least some of these chemicals may be employed to clean the surface of the tire by removing foreign matter applied during manufacturing or clean the tire surface after the tire has been used, especially on a dirt track. At least some of these chemicals may be used to modify the adhesion of the tire to a given surface, including dirt, clay, asphalt, concrete or even surfaces that have been treated with a dried soft drink resin, such as dried Coca-Cola resin. Coca-Cola is a registered trademark of Coca-Cola Inc.

It is generally accepted that the above chemicals are to some degree effective. These chemicals and combinations thereof work in various ways and in combination of ways, all of which are not clearly understood.

One method is that solvents are chosen that are extremely good solvents for the components in the tires that are solvent soluble. The chosen solvents have a high enough vapor pressure so that they evaporate relatively quickly. During evaporation, these solvents draw chemicals out of the tires and leave other tire chemicals or components at a higher concentration than normal at the surface of an untreated tire. This gives a temporary advantage until the rubber with this higher concentration either wears off, or the temperature of the tire increases to a point that the chemicals at elevated levels themselves evaporate, or some combination of both.

Another method is to apply a neat or dilute chemical with lower volatility that mimics the components in the tires as supplied. This is the major use of Methylnaphthalene in treating tires. Other petroleum distillates and/or coal tar distillates are also employed to yield a similar effect.

Chemicals may be chosen because they purge the surface of loose particulate matter that may include tire particulate, clay, dirt or other matter that tires may pick up during racing or even in normal use.

In many cases, the methods employed for tire treatment reduce the life of the tire and the methods slowly destroy the structure or integrity of the composition of the tire.

The use of esters for prior art methods appears to be limited to phthalate esters.

SUMMARY OF THE INVENTION

This invention relies on the use of synthetic compounds having an ester structure to accomplish a desired result without the normal problems associated with traditional methods. The family of esters is so vast that every currently desired tire treatment effect can be accomplished and the detrimental effects associated with traditional techniques can be avoided. By proper selection, the treatments can be made free of carcinogens, suspect carcinogens, mutagens, teratogens, marine pollutants, poisons, other environmental pollutants and the flammability can be reduced.

Tires can be cleaned with esters that are water soluble.

The durometer of tires can be lowered using lower molecular weight esters and yet these esters can have a low enough vapor pressure to minimize their evaporation and adhesion of the tire can be improved.

Tires can be treated with higher molecular weight esters so that the durometer is not modified and yet adhesion is improved.

Tires can have an application of correctly chosen esters so that the effects of a higher concentration of the actual components of the tire at the surface can be mimicked.

The tire life can be increased and performance improved.

The esters employed with this method can be mono esters, di, and/or tri acid esters, di and/or tri basic esters, anionic and/or nonionic phosphate esters and/or ester resins.

The esters that can be employed in the method of this invention include Benzoates, Acetates, Adipates, Glutarates, Succinates, Sebacates, Citrates, Maleates, Phthalates, anionic and nonionic Phosphates, Phosphonates, Acrylates, Fluoroalkyl ester resins, Perfluoroalkyl ester resins, Esters of Soybean Oil and other Fatty Acid Esters.

DETAILED DESCRIPTION OF THE PREFERRED EMBODIMENTS

In this invention, formulations including esters have been applied to tires after their manufacture to improve the performance of the tires, and especially to improve the racing performance of tires to which the esters have been applied. It has been found that the application of esters and of formulations containing esters can improve the performance of tires. It has also been found that the addition of different esters can result in improvement of different tire performance characteristics. It has also been found that the addition of multiple esters as part of the same formulations can also result in performance enhancements. Furthermore, it has been found that the application of different formulations of esters, in separately applied coats can also be advantageous in improving the performance of tires.

This method of treating tire surfaces to modify performance includes the steps of: applying at least one ester selected from the group of esters consisting of monoesters, diesters, triesters, tetraesters, ester resins, polyesters, phosphate esters and phosphonate esters to a tire surface to vary the adhesion or bite of the tire to the road surface, and/or the tire life, an/or the tire performance and/or the tire hardness.

In practicing this method the group members monoesters, diesters, triesters, tetraesters include the esters of both hydrocarbyl monocarboxylic acid and hydrocarbyl polycarboxylic acids as well as hydrocarbyl monohydroxy alcohol and hydrocarbyl polyols.

According to aspects of this method the hydrocarbyl groups can be selected from straight chain, branched chain, or aromatic hydrocarbyl groups or admixtures thereof and may be saturated or unsaturated. The hydrocarbyl groups are predominantly composed of carbon and hydrogen but may contain one or more hetero atoms such as sulfur, oxygen, fluorine and nitrogen.

Group members including resin esters, oligomer esters and polyesters, are complex esters prepared from the mixtures of hydrocarbyl carboxylic acid and hydrocarbyl polycarboxylic acids as well as hydrocarbyl monohydroxy alcohol and hydrocarbyl polyols.

The hydrocarbyl groups can be selected from straight chain, branched chain, or aromatic hydrocarbyl groups or admixtures thereof and may be saturated or unsaturated. Hydrocarbyl groups can be predominantly composed of carbon and hydrogen but may contain one or more hetero atoms such as sulfur, oxygen, fluorine and nitrogen.

According to one aspect of this invention, the group member phosphate esters are selected from a group of esters consisting of hydrocarbyl phosphate ester free acids and nonionic hydrocarbyl phosphate esters.

The group member phosphonate esters can be selected from a group of esters consisting of hydrocarbyl phosphonate ester free acids, nonionic hydrocarbyl phosphonate esters, hydrocarbyl diphosphonate ester free acids and nonionic hydrocarbyl diphosphonate esters.

The following examples demonstrate improvements that have been demonstrated by the application of specific formulations.

Example No. 1

A first method of cleaning tires with a composition including at least one ester in accordance with this invention is employed to clean tires with almost no odor. This method employs the following formulation.

|  | Percentage by Weight |
|---|---|
| ISOPAR G | 83.00000 |
| DIBUTYL MALEATE | 2.00000 |
| BUTYL BENZOATE | 4.50000 |
| 2-ETHYL HEXYL BENZOATE | 3.50000 |
| DIOCTYL SEBACATE | 3.50000 |
| TRIBUTOXYETHYL PHOSPHATE | 3.50000 |
| ** Total Percentage ** | 100.00000. |

ISOPAR G:

SYNTHETIC ISOPARAFFINIC HYDROCARBON(CAS No: 64742_489) SYN: Branched Aliphatic Hydrocarbon

DBM:

DIBUTYL MALEATE (CAS No: 105_76_0) SYN: 2_BUTENEDIOIC ACID DIBUTYL ESTER, BUTYL MALEATE, MALEIC ACID DIBUTYL ESTER

BB:

BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

2_ETHYLHEXYL BENZOATE (CAS No: 5444_75_7) SYN: OCTYL BENZOATE, 2EH BENZOATE, BENZOIC ACID 2-ETHYLHEXYL ESTER

DOS:

DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

TBEP:

TRIBUTOXYETHYL PHOSPHATE (CAS No: 78_51_3) SYN: TRIBUTOXYETHYL PHOSPHATE, TRI(BUTOXYETHYL)PHOSPHATE, 2_BUTOXYETHANOL PHOSPHATE, TBEP, PHOSPHORIC ACID TRIS(BUTOXYETHYL)ESTER, TRI(2_BUTOXYETHYL)PHOSPHATE, TRIBUTYL CELLOSOLVE PHOSPHATE

Application of this composition will drop the hardness (or reduce the durometer) of a tire when at room temperature, between 0 and 10 points, depending upon the number of coats applied. A point is a dimensionless scale reading ranging from 0 to 100 determined by a standard durometer test of rubber or elastomeric material, where the smaller reading indicates a softer, or more pliable or more flexible material. This method results in extra sticky tread on new tires, and can be employed when there is little time to clean and prep the tires before using them in a race. As soon as the tires are mounted and are available to treat, at least one coat so as too completely cover the tread of the tire. More coats will result in a softer and more sticky tire. Each coat is allowed to dry for between 10 and 20 minutes before the next coat is applied. For softer tires 3 or 4 coats may be applied. This composition can also be applied to the inside of a tire, but if employed in this manner the tire should be pressurized with nitrogen, and air should not be used. If this composition is employed on the inside of the tire, depressurizing should occur only in the absence of a spark or a flame. This composition has been successfully employed on natural and synthetic rubber.

Example No. 2

This method is also used to clean tires. This composition is a water based cleaner that either are to be treated with another tire treatment or will subsequently be treated. This composition will improve the way in which other tire treatments are absorbed, because the surface of the tire will be cleaner. This method employs the following formulation.

|                                  | Percentage by Weight |
|---|---|
| DOWANOL DPM-SOLVENT ETHER DPM    | 3.00000 |
| DOWANOL PnP                      | 5.00000 |
| DOSS 70%                         | 1.00000 |
| STEOL CS_460                     | 0.50000 |
| WATER                            | 85.50000 |
| ETHYLENE GLYCOL DIACETATE        | 1.00000 |
| DIBASIC ESTER                    | 3.00000 |
| F3700                            | 0.50000 |
| 4500 MW POLYACRYLATE Na SALT     | 0.50000 |
| ** Total Percentage **           | 100.00000 |

DPM:

DIPROPYLENE GLYCOL MONOMETHYL ETHER(CAS No: 34590_94_8) SYN: DIPROPDXYMETHANOL, DPM, DIPROPYLENE GLYCOL METHYL ETHER, DPGME

PnP:

PROPOXYLATED n-PROPANOL (CAS No: 1569_01_3) SYN: DOWANOL PnP, PROPYLENE GLYCOL n-PROPYL ETHER, PGnPE

DOSS:

DIOCTYL SULFOSUCCINATE 70% (CAS No. 577_11_7) SYN: DIOCTYL SULFOSUCCINATE SODIUM SALT, DIOCTYL SODIUM SULPHOSUCCINATE

CS-460: SODIUM LAURETH SULFATE (CAS No. 9004_82_4) SYN: ALCOHOL ETHOXYLATE SULFATE SODIUM SALT, SODIUM POE LAURYL SULFATE POE n>3

WATER (CAS No. 7732_18_5) SYN: $H_2O$

ETHYLENE GLYCOL DIACETATE (CAS No. 111_55_7) SYN: 1,2_DIACETOXYETHANE, 1,2_ETHANEDIOL DIACETATE, ETHYLENE GLYCOL ACETATE, APTEX DONOR H_Plus

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

MITSUBISHI IDENTIFIER FOR AMBIENT CURE PERFLUORO ALKYL ACRYLATE DISPERSION IN WATER (CAS No. PROPRIETARY)

454N:

4500 MW POLYACRYLATE Na SALT (CAS No. 9003_04_7)

SYN: SODIUM POLYACRYLATE

This composition is water soluble and can be sprayed liberally on and removed with a rag to clean tires that have been run on a dirt track. This composition can be sprayed liberally on the tire, which is allowed to sit for 30 seconds to 5 minutes. The composition is then wiped off with a rag. The tire should then be allowed to dry completely before another tire treatment is applied. This tire treatment can be used between racing heats. This composition has been found to be effective when used with racing vehicles that run on tracks that have dried syrup used on concert tracks, with sealer (lignosulfonate) used on sealer tracks, and for use on tires raced on clay or dirt tracks. This method can be used to clean tires in conjunction with the remaining methods.

Example No. 3

This method will drop the hardness of tires, at room temperature, between 0 and 5 points, depending on the number of coats applied, and is used after tires are cleaned with the formulation of Example No. 2 This method employs the following formulation

|                              | Percentage by Weight |
|---|---|
| ISOPAR G                     | 59.50000 |
| BUTYL BENZOATE               | 3.00000 |
| DIOCTYL SEBACATE             | 9.50000 |
| 2_ETHYLHEXYL BENZOATE        | 11.00000 |
| TRIBUTOXYETHYL PHOSPHATE     | 9.50000 |
| SOLVENT FLUOROALKYL ACRYLATE RESIN | 5.00000 |
| d_LIMONENE                   | 2.50000 |
| ** Total Percentage **       | 100.00000 |

ISOPAR G:

SYNTHETIC ISOPARAFFINIC HYDROCARBON(CAS No: 64742_48_9) SYN: Branched Aliphatic Hydrocarbon

BB:

BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

DOS:

DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

2_ETHYLHEXYL BENZOATE (CAS No: 5444_75_7) SYN: OCTYL BENZOATE, 2EH BENZOATE, BENZOIC ACID 2-ETHYLHEXYL ESTER

TBEP:

TRIBUTOXYETHYL PHOSPHATE (CAS No: 78_51_3)

SYN: TRIBUTOXYETHYL PHOSPHATE, TRI(2_BUTOXYETHYL)PHOSPHATE, 2_BUTOXYETHANOL PHOSPHATE, TBEP, TRIBUTYL CELLOSOLVE PHOSPHATE PHOSPHORIC ACID TRIS(BUTOXYETHYL)ESTER, TRI(BUTOXYETHYL)PHOSPHATE

F611

MITSUBISHI IDENTIFIER FOR AMBIENT CURE SOLVENT SOLUBLE

FLUOROALKYL ACRYLATE RESIN(CAS No. PROPRIETARY) SYN: FLUOROACRYLATE COPOLYMER RESIN—SOLVENT SOLUBLE

| d-LIMONENE: (CAS No: 8028-48-6) | SYN: ORANGE TERPENE, TERPENE HYDROCARBON, ORANGE RIND STEAM DISTILLATE |
|---|---|

On average the hardness is dropped by 2 points when this formulation is employed. This formulation is used to provide dirt repellent for dirt tracks, but it can also be used for asphalt tracks. A single thin coat is sufficient for most circumstances, and it should be allowed to dry fully for most benefit. This formulation can be used as a base coat applied approximately 3 days before the tire is used in a race. A spray bottle, paint roller, a sponge or some other applicator can be used to completely cover the tread of the tire with one or two coats. This formulation is applied only to the outside of the tire and is not used on the inside of the tire because it will not completely pass through. This formulation is not used to soften the tires, but it will nevertheless provide excellent "bite" or grip. This formulation lasts for all heats in a single day and it can increase the life of the tire if used properly. When racing on dirt, the tires should be wiped down between heats. This formulation works on both natural or synthetic rubber tires.

Example No. 4

This method is used to prepare tires for racing on wet or soft dirt tracks, but is not suited for use on cold, dry, slick tracks. This method employs the following formulation:

|  | Percentage by Weight |
| --- | --- |
| DIBASIC ESTER | 5.00000 |
| BUTYL BENZOATE | 15.00000 |
| METHYL BENZOATE | 40.00000 |
| SOY METHYL ESTER | 35.00000 |
| BUTYL CELLOSOLVE BENZOATE | 5.00000 |
| ** Total Percentage ** | 100.00000 |

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

BB.

BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

MB

METHYL BENZOATE (CAS No: 93_58_3) SYN: MB, BENZOIC ACID METHYL ESTER, BENZOIC ACID ESTER of METHANOL, NIOBE OIL

SOY METHYL ESTER

FATTY ACID METHYL ESTER(CAS No. 67784_80_9) SYN: C14-C24 METHYL ESTER, FATTY ACID METHYL ESTER, SOYA METHYL ESTER, METHYL SOYATE

BCB

BUTYL CELLOSOLVE BENZOATE (CAS No: 5451_76_3)

SYN: BUTOXYETHYL BENZOATE, ETHYLENE GLYCOL MONOBUTYL BENZOATE, BENZOIC ACID BUTYL CELLOSOLVE ESTER

This formulation can be used after cleaning the tires with the formulation of Example No. 2. It has been demonstrated that the hardness of the tire, at room temperature, will drop between 5 to 35 points, depending on the number of coats applied. The reduction in hardness is permanent. Five days before use, a spray bottle, paint roller, sponge or other applicator should be used to cover the tread with two or more coats. Each coat is allowed to dry before applying the next coat. This will take about 10 to 20 minutes. For softer tires the number of coats should be increased from 3 to 6. The next day the same process should be repeated, and the process can be again repeated after another 24 hours. This process will last for a full night of racing and can improve tire life for tires made of natural or synthetic rubber. When used with tires racing on dirt, the tires should be wiped down using the formulation of Example No. 3 between racing heats.

Example No. 5

This method uses a formulation that will provide extra sticky tread under cold conditions. This method employs the following formulation:

|  | Percentage by Weight |
| --- | --- |
| ISOPAR G | 27.00000 |
| SOY METHYL ESTER | 9.00000 |
| METHYL BENZOATE | 9.00000 |
| DIBASIC ESTER | 6.00000 |
| DIBUTYL MALEATE | 10.00000 |
| BUTYL BENZOATE | 10.00000 |
| BUTYL CELLOSOLVE BENZOATE | 10.00000 |
| 2-ETHYLHEXYL BENZOATE | 9.00000 |
| d-LIMONENE | 10.00000 |
| ** Total Percentage ** | 100.00000 |

ISOPAR G:

SYNTHETIC ISOPARAFFINIC HYDROCARBON(CAS No: 64742_48_9) SYN: BRANCHED ALIPHATIC HYDROCARBON

SOY METHYL ESTER

FATTY ACID METHYL ESTER(CAS No. 67784_80_9) SYN: C14-C24 METHYL ESTER, FATTY ACID METHYL ESTER, SOYA METHYL ESTER, METHYL SOYATE

MB

METHYL BENZOATE (CAS No: 93_58_3) SYN: MB, BENZOIC ACID METHYL ESTER, BENZOIC ACID ESTER of METHANOL, NIOBE OIL

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

DBM:

DIBUTYL MALEATE (CAS No: 105_76_0) SYN: 2_BUTENEDIOIC ACID DIBUTYL ESTER, BUTYL MALEATE, MALEIC ACID DIBUTYL ESTER

BB:

BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

BCB

BUTYL CELLOSOLVE BENZOATE (CAS No: 5451_76_3)

SYN: BUTOXYETHYL BENZOATE, ETHYLENE GLYCOL MONOBUTYL BENZOATE, BENZOIC ACID BUTYL CELLOSOLVE ESTER

2_ETHYLHEXYL BENZOATE (CAS No: 5444_75_7) SYN: OCTYL BENZOATE, 2EH BENZOATE, BENZOIC ACID 2-ETHYLHEXYL ESTER

| | |
|---|---|
| d-LIMONENE: (CAS No: 8028-48-6) | SYN: ORANGE TERPENE, TERPENE HYDROCARBON, ORANGE RIND STEAM DISTILLATE |

This formulation and method will drop the hardness of the tire, at room temperature, between 15 and 35 points, or an average of 20 points, depending on the number of coats employed. Five days before use, a spray bottle, paint roller, sponge or other applicator should be used to cover the tread with three or more coats. Each coat is allowed to dry for about 10 to 20 minutes before applying the next coat. These steps are repeated the next day, and on a third day if desired. Further softness can require 5 or 6 coats. Twenty four hours before a race, these steps can be repeated for even softer tires. This method is suited for use with natural and synthetic rubber tires.

Example No. 6

This method is best suited for use after the spring rainy season is over and has been shown to drop the hardness of a tire, at room temperature, between 3-25 points with the average being 10 points. This method employs the following formulation.

| | Percentage by Weight |
|---|---|
| DIBASIC ESTER | 58.00000 |
| DIBUTYL MALEATE | 10.00000 |
| 2_ETHYLHEXYL BENZOATE | 17.00000 |
| DIOCTYL SEBACATE | 15.00000 |
| ** Total Percentage ** | 100.00000 |

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

DBM:

DIBUTYL MALEATE (CAS No: 105_76_0) SYN: 2_BUTENEDIOIC ACID DIBUTYL ESTER, BUTYL MALEATE, MALEIC ACID DIBUTYL ESTER

2_ETHYLHEXYL BENZOATE (CAS No: 5444_75_7) SYN: OCTYL BENZOATE, 2EH BENZOATE, BENZOIC ACID 2-ETHYLHEXANOL ESTER

DOS:

DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

Five days before use, a spray bottle, paint roller, sponge or other applicator should be used to cover the tread with two or more coats. Each coat is allowed to dry before applying the next coat. The process steps for this method are the same as for Example No. 4. Although most often applied from the outside, this formulation can be applied from the inside. One to two ounces are used per tire when applied from the inside of the tire.

Example No. 7

This process is suited for use on asphalt tracks and can also be used for drag racing. It will drop the hardness of a tire, at room temperature, between 5 to 25 points, depending on the number of coats. This method employs the following formulation.

| | Percentage by Weight |
|---|---|
| ISOPAR G | 61.50000 |
| DIBASIC ESTER | 11.00000 |
| DIBUTYL MALEATE | 11.00000 |
| DIOCTYL SEBACATE | 11.00000 |
| d-LIMONENE | 5.50000 |
| ** Total Percentage ** | 100.00000. |

ISOPAR G:

SYNTHETIC ISOPARAFFINIC HYDROCARBON(CAS No: 64742_48_9)

SYN: BRANCHED ALIPHATIC HYDROCARBON

DBE:

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

DOS:

DIOCTYL SEBACATE (CAS No: 122_62_3) SYN: OCTYL SEBACATE, BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

| | |
|---|---|
| d-LIMONENE: (CAS No: 8028-48-6) | SYN: ORANGE TERPENE, TERPENE HYDROCARBON, ORANGE RIND STEAM DISTILLATE |

Five days before a race apply this material too completely cover the tread with 2 or more coats. Allow to dry between coats and repeat the next day. Wrapping the tires is optional. When wrapping, wait until the second night. Wait for the tire to look dry and wrap in dry paper towels and then in a clear plastic wrap. Unwrap at least 24 hours before racing. This formulation can be used as a pre race wipe if allowed to dry.

Example No. 8

This method is suited for use on dirt, and the tires will run cooler on hot dusty tracks.

The hardness will be reduced between 0 to 5 points, with the average being 2 points. This method employs the following formulation

|  | .Percentage by Weight |
|---|---|
| DIBASIC ESTER | 63.00000 |
| DIOCTYL SEBACATE | 23.00000 |
| CYCLIC OLIGOMER PHOSPHONATE | 6.00000 |
| TRIBUTOXYETHYL PHOSPHATE | 7.00000 |
| ** Total Percentage ** | 100.00000 |

DBE:

DBE—DIBASIC ESTER—DUPONT NAME FOR BLEND OF:

DIMETHYL GLUTURATE (CAS No: 1119__40__0)

DIMETHYL ADIPATE (CAS No: 627__93__0)

DIMETHYL SUCCINATE (CAS No: 106__65__0)

DOS:

DIOCTYL SEBACATE (CAS No: 122__62__3) SYN: OCTYL SEBACATE,

BIS(2_ETHYLHEXYL)SEBACATE, DOS, DEHS, SEBACIC ACID BIS (2_ETHYLHEXYL) ESTER, DECANEDIOIC ACID BIS(2_ETHYLHEXYL) ESTER

CYCLIC OLIGOMERIC PHOSPHONATE (Cas No. 41203-81-0 and 42595-45-9)

TBEP:

TRIBUTOXYETHYL PHOSPHATE (CAS No: 78__51__3) SYN: TRIBUTOXYETHYL PHOSPHATE, TRI(BUTOXYETHYL)PHOSPHATE, 2_BUTOXYETHANOL PHOSPHATE,

TBEP, PHOSPHORIC ACID TRIS(BUTOXYETHYL)ESTER,

TRI(2_BUTOXYETHYL)PHOSPHATE, TRIBUTYL CELLOSOLVE PHOSPHATE

When used for cars or go karts, eight to ten days are needed for curing and tires should not be wrapped using this method. On the first night apply 2-4 coats. Allow 1-2 hours for drying between coats. Tires should be stored for eight to ten days after the formulation is applied. This formulation will not appreciably soften the tire, but will give it excellent bite. When used for go karts or similar vehicles dilute this formulation with Naphtha VM &P using 3 parts Naphtha VM &P to one part of this formulation. If used at full strength, this formulation can lock down a go kart, so that the power of the kart cannot overcome the adhesion of the tires to the surface that can be attained with this formulation. This material should be applied only to the outside of a tire. The formulation can be diluted as much as 1 part in 10 and will still be effective.

Example No. 9

This method is intended for use when the temperature falls below 50 degrees F.

This method employs the following formulation:

|  | Percentage by Weight |
|---|---|
| d-LIMONENE | 28.00000 |
| AROMATIC 150 ND | 10.00000 |
| PROPOXYMETHYL ACETATE | 30.00000 |
| SOY METHYL ESTER | 9.00000 |
| DIBUTYL MALEATE | 9.00000 |
| BUTYL BENZOATE | 9.00000 |
| DIBASIC ESTER | 3.00000 |
| CYCLIC OLIGOMER PHOSPHONATE | 0.50000 |
| DIOCTYL SEBACATE | 1.00000 |
| TRIBUTOXYETHYL PHOSPHATE | 0.50000 |
|  Total Percentage  | 100.00000 | d-LIMONENE: (CAS No: 8028-48-6) SYN: ORANGE TERPENE, TERPENE HYDROCARBON, ORANGE RIND STEAM DISTILLATE

AROMATIC 150 ND (CAS No. 64742-94-5) SYN: AROMATIC 150 NAPHTHALENE DEPLETED, HEAVY AROMATIC NAPHTHA NAPHTHALENE DEPLETED

PMA:

PROPYLENE GLYCOL MONOMETHYL ETHER ACETATE (CAS No: 108-65-6) SYN: PROPOXYMETHYL ACETATE, PMA, PGMEA, METHYL PARASOL ACETATE

SOY METHYL ESTER

FATTY ACID METHYL ESTER(CAS No. 67784__80__9) SYN: C14-C24 METHYL ESTER, FATTY ACID METHYL ESTER, SOYA METHYL ESTER, METHYL SOYATE

DBM:

DIBUTYL MALEATE (CAS No: 105__76__0) SYN: 2_BUTENEDIOIC ACID DIBUTYL ESTER, BUTYL MALEATE, MALEIC ACID DIBUTYL ESTER

BB:

BUTYL BENZOATE (CAS No: 136__60__7) SYN: BUTYL BENZOATE, n_BUTYL BENZOATE, BENZOIC ACID n_BUTYL ESTER, BENZOIC ACID BUTYL ESTER

DBE:

DBE—DIBASIC ESTER—DUPONT NAME FOR BLEND OF:

DIMETHYL GLUTURATE (CAS No: 1119__40__0)

DIMETHYL ADIPATE (CAS No: 627__93__0)

DIMETHYL SUCCINATE (CAS No: 106__65__0)

CYCLIC OLIGOMERIC PHOSPHONATE (Cas No. 41203-81-0 and 42595-45-9)

DOS:

DIOCTYL SEBACATE (CAS No: 122_62_3) SYN: OCTYL SEBACATE,

BIS(2_ETHYLHEXYL)SEBACATE, DOS, DEHS, SEBACIC ACID BIS (2_ETHYLHEXYL)

ESTER, DECANEDIOIC ACID BIS(2_ETHYLHEXYL) ESTER

TBEP:

TRIBUTOXYETHYL PHOSPHATE (CAS No: 78_51_3) SYN: TRIBUTOXYETHYL PHOSPHATE, TRI(BUTOXYETHYL)PHOSPHATE, 2_BUTOXYETHANOL PHOSPHATE,

TBEP, PHOSPHORIC ACID TRIS(BUTOXYETHYL)ESTER,

TRI(2_BUTOXYETHYL)PHOSPHATE, TRIBUTYL CELLOSOLVE PHOSPHATE

This formulation works well when the formulation of Example No. 5 is used as a base treatment and a track side treatment is also needed. At 40 degrees F., it takes about 15 minutes to dry, but at 65 degrees F. 3 or 4 coats can be applied in less than 20 minutes.

Example No. 10

This method proves more bite, or in other words increases the coefficient of friction between a tire and a surface, without softening the tire. This formulation can be used as a pretreatment in the same manner as in the method of Example No. 8 or it can be used at the track. It is intended for use with go karts. The formulation used in this method is as follows:

|  | Percentage by Weight |
| --- | --- |
| DIBASIC ESTER | 39.00000 |
| PROPOXYMETHYL ACETATE | 5.00000 |
| DIPROPOXYMETHANOL | 5.00000 |
| DIOCTYL SEBACATE | 14.50000 |
| CYCLIC OLIGOMER PHOSPHONATE | 3.20000 |
| TRIBUTOXYETHYL PHOSPHATE | 2.50000 |
| BUTYL BENZOATE | 1.50000 |
| DIBUTYL MALEATE | 2.00000 |
| ISOPAR G | 25.30000 |
| TEXANOL | 2.00000 |
| ** Total Percentage ** | 100.0000 |

DBE:

DBE—DIBASIC ESTER—DUPONT NAME FOR BLEND OF:

DIMETHYL GLUTURATE (CAS No: 1119_40_0)

DIMETHYL ADIPATE (CAS No: 627_93_0)

DIMETHYL SUCCINATE (CAS No: 106_65_0)

PMA:

PROPYLENE GLYCOL MONOMETHYL ETHER ACETATE (CAS No: 108-65-6) SYN:

PROPOXYMETHYL ACETATE, PMA, PGMEA, METHYL PARASOL ACETATE

DPM:

DIPROPYLENE GLYCOL MONOMETHYL ETHER(CAS No: 34590_94_8) SYN: DIPROPDXYMETHANOL, DPM, DIPROPYLENE GLYCOL METHYL ETHER, DPGME

DOS:

DIOCTYL SEBACATE (CAS No: 122_62_3) SYN: OCTYL SEBACATE,

BIS(2_ETHYLHEXYL)SEBACATE, DOS, DEHS, SEBACIC ACID BIS (2_ETHYLHEXYL)

ESTER, DECANEDIOIC ACID BIS(2_ETHYLHEXYL) ESTER

CYCLIC OLIGOMERIC PHOSPHONATE (Cas No. 41203-81-0 and 42595-45-9)

TBEP:

TRIBUTOXYETHYL PHOSPHATE (CAS No: 78_51_3) SYN: TRIBUTOXYETHYL PHOSPHATE, TRI(BUTOXYETHYL)PHOSPHATE, 2_BUTOXYETHANOL PHOSPHATE,

TBEP, PHOSPHORIC ACID TRIS(BUTOXYETHYL)ESTER,

TRI(2_BUTOXYETHYL)PHOSPHATE, TRIBUTYL CELLOSOLVE PHOSPHATE

BB:

BUTYL BENZOATE (CAS No: 136_60_7) SYN: BUTYL BENZOATE, n_BUTYL BENZOATE, BENZOIC ACID n_BUTYL ESTER, BENZOIC ACID BUTYL ESTER

DBM:

DIBUTYL MALEATE (CAS No: 105_76_0) SYN: 2_BUTENEDIOIC ACID DIBUTYL ESTER, BUTYL MALEATE, MALEIC ACID DIBUTYL ESTER

ISOPAR G:

SYNTHETIC ISOPARAFFINIC HYDROCARBON(CAS No: 64742_48_9) SYN:

Branched Aliphatic Hydrocarbon

TEXANOL 2,2,4_TRIMETHYL_1,3_PENTANEDIOL MONOISOBUTYRATE (CAS No: 25265_77_4)

SYN: PROPIONIC ACID, 2_METHYL_, MONOESTER WITH 2,2,4_TRIMETHYL_1,3_PENTANEDIOL, ISOBUTYRIC ACID ESTER WITH 2,2,4_TRIMETHYL_1,3_PENTANEDIOL

It should be understood that the precise percentages of the components for each of these representative formulations is in general not critical. Changes in the concentrations of specific esters can result in similar performance. It is rather the selection of the esters and subsidiary components and their resulting effect on such parameters as hardness, adhesion, bite and cleaning that is significant When applied to a surface of the tire, ester or esters employed herein will change the coefficient of friction (or adhesion) and/or the softness (or hardness) of the tire. These are structural properties and are at least in part bulk properties of a tire. These structural changes would not occur if the formulations merely formed films on the surface of the tire.

To effect these bulk structural changes the ester or esters employed herein penetrate the tire. With the exception of Example 2, which is used as a cleaner, and Example 3, which is applied as a thin layer to act as a dirt repellant or act as a base coat and, as previously described, will not completely pass through the tire, these formulations are applied to act on the tire over a period of time of at least 10 minutes per coat and up to 10 days as described with reference to Examples 1 and 4-10 before operating the tire on a road surface.

The invention claimed is:

1. A method of improving operation of a tire having a tire tread on a road surface by modifying the performance of a previously manufactured tire including the steps of: treating a tire surface by applying a mixture of at least two esters, wherein the esters are selected from the group consisting of monoesters, diesters, triesters, tetraesters, oligomer esters, phosphate esters and phosphonate esters, to the tire surface selected from the group consisting of the tire tread and an inside surface of the tire to increase the adhesion of the tire and the tire tread to the road surface, followed by the step of allowing a minimum of ten minutes before operating the tire, and followed by the step of operating the tire on the road surface.

2. The method as claimed in claim 1 wherein at least one ester is selected from the subgroup consisting of monoesters, diesters, triesters, and tetraesters include the esters of hydrocarbyl groups of both hydrocarbyl monocarboxylic acid and hydrocarbyl polycarboxylic acids as well as hydrocarbyl monohydroxy alcohol and hydrocarbyl polyols.

3. The method as claimed in claim 2 wherein hydrocarbyl groups can be selected from the subgroup consisting of straight chain, branched chain, or aromatic hydrocarbyl groups or admixtures thereof and may be saturated or unsaturated.

4. The method as claimed in claim 2 wherein hydrocarbyl groups are predominantly composed of carbon and hydrogen but may contain one or more hetero atoms selected from the group consisting of sulfur, oxygen, fluorine and nitrogen.

5. The method as claimed in claim 1 wherein esters selected from the subgroup consisting of oligomer esters are complex esters prepared from the mixtures of hydrocarbyl carboxylic acid and hydrocarbyl polycarboxylic acids as well as mixtures of hydrocarbyl monohydroxy alcohol and hydrocarbyl polyols.

6. The method as claimed in claim 5 wherein the hydrocarbyl carboxylic acid and hydrocarbyl polycarboxylic acids and hydrocarbyl monohydroxy alcohol and hydrocarbyl polyols can be selected from straight chain, branched chain, or aromatic hydrocarbyl groups or admixtures thereof and may be saturated or unsaturated.

7. The method as claimed in claim 5 wherein the hydrocarbyl carboxylic acid and hydrocarbyl polycarboxylic acids and hydrocarbyl monohydroxy alcohol and hydrocarbyl polyols are predominantly composed of carbon and hydrogen but may contain one or more hetero atoms selected from the group consisting of sulfur, oxygen, fluorine and nitrogen.

8. The method as claimed in claim 1 wherein the phosphate ester is selected from the group of esters consisting of hydrocarbyl phosphate ester free acid and nonionic hydrocarbyl phosphate ester.

9. The method as claimed in claim 1 wherein the phosphonate ester is selected from the group of esters consisting of hydrocarbyl phosphonate ester free acid, nonionic hydrocarbyl phosphonate ester, hydrocarbyl diphosphonate ester free acid and nonionic hydrocarbyl diphosphonate ester.

10. The method as claimed in claim 1 wherein the road surface is asphalt.

11. The method as claimed in claim 1 wherein the road surface is selected from the group consisting of clay and dirt.

12. The method as claimed in claim 1 wherein the road surface is concrete.

13. The method as claimed in claim 1 wherein the road surface is a dried syrup selected from the group consisting of soda syrup and sugar syrup.

14. The method as claimed in claim 1 wherein the road surface is ice.

15. The method as claimed in claim 1 wherein the road surface is sand.

16. The method as claimed in claim 1 wherein the road surface is a race track.

17. The method of claim 1 wherein the at least two esters selected comprise at least seventeen percent by weight of the mixture.

18. The method of claim 17 wherein the at least two esters are dispersed in a synthetic isoparaffinic hydrocarbon solvent.

19. The method of claim 1 wherein the at least two esters selected comprise one hundred percent by weight of the mixture.

20. The method of claim 1 further comprising the step of applying the at least one ester as part of a mixture wherein the adhesion of the tire and the tire tread is increased and the tire hardness or durometer is reduced by less than five points.

21. The method of claim 1 wherein the mixture of at least two esters includes a glutarate, an adipate and a succinate.

22. The method of claim 1 wherein the mixture of at least two esters includes a maleate ester.

23. The method of claim 1 wherein the mixture of at least two esters includes a sebacate ester.

24. The method of claim 1 wherein the mixture of at least two esters includes a phosphate ester.

25. The method of claim 1 wherein the mixture of at least two esters includes an adipate ester.

26. A method of improving operation of a tire having a tire tread on a road surface by modifying the performance of a previously manufactured tire including the steps of: treating a tire surface by applying a mixture of at least two esters, wherein the esters are selected from the group consisting of monoesters, diesters, triesters, tetraesters, oligomer esters, phosphate esters and phosphonate esters, to the tire surface selected from the group consisting of the tire tread and an inside surface of the tire to penetrate the tire and to increase the adhesion of the tire and the tire tread to the road surface, followed by the step of allowing a minimum of ten minutes before operating the tire to allow the at least one ester to penetrate the tire, and followed by the step of operating the tire on the road surface.

27. A method of improving operation of a tire having a tire tread on a road surface by modifying the performance of a previously manufactured tire including the steps of: treating a tire surface by applying a mixture of at least two esters, wherein the esters are selected from the group consisting of monoesters, diesters, triesters, tetraesters, oligomer esters, phosphate esters and phosphonate esters, to the tire surface selected from the group consisting of the tire tread and an inside surface of the tire to vary the durometer of the tire, followed by the step of allowing a minimum of ten minutes before operating the tire, and followed by the step of operating the tire on the road surface.

* * * * *